United States Patent
Katsu

(10) Patent No.: US 10,891,846 B2
(45) Date of Patent: Jan. 12, 2021

(54) INFORMATION PROCESSING DEVICE, INFORMATION PROCESSING METHOD, AND PROGRAM

(71) Applicant: SONY CORPORATION, Tokyo (JP)

(72) Inventor: Masanori Katsu, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/557,251

(22) PCT Filed: Mar. 2, 2016

(86) PCT No.: PCT/JP2016/056480
§ 371 (c)(1),
(2) Date: Sep. 11, 2017

(87) PCT Pub. No.: WO2016/199463
PCT Pub. Date: Dec. 15, 2016

(65) Prior Publication Data
US 2018/0053395 A1    Feb. 22, 2018

(30) Foreign Application Priority Data

Jun. 12, 2015    (JP) .................. 2015-119448

(51) Int. Cl.
*G08B 21/18*    (2006.01)
*G06F 21/62*    (2013.01)
(Continued)

(52) U.S. Cl.
CPC ............. *G08B 21/18* (2013.01); *G06F 21/50* (2013.01); *G06F 21/629* (2013.01); *G06F 21/6245* (2013.01); *G06F 21/82* (2013.01); *H04K 3/822* (2013.01); *H04W 4/02* (2013.01); *H04W 4/38* (2018.02); *H04K 2203/12* (2013.01);
(Continued)

(58) Field of Classification Search
CPC ................................ G08B 21/18; G06F 21/50
See application file for complete search history.

(56) References Cited

U.S. PATENT DOCUMENTS 9,922,506 B2 * 3/2018 Hodges ............... G07F 19/2055
2011/0143779 A1   6/2011 Rowe et al.
(Continued)

FOREIGN PATENT DOCUMENTS

JP    H10-136344 A    5/1988
JP    2001-127897 A    5/2001
(Continued)

OTHER PUBLICATIONS

Oct. 2, 2018, European Search Report issued for related EP Application No. 16807170.2.

*Primary Examiner* — Quan-Zhen Wang
*Assistant Examiner* — Rajsheed O Black-Childress
(74) *Attorney, Agent, or Firm* — Paratus Law Group, PLLC

(57) ABSTRACT

There is provided an information processing device that enables recognition that there is a sensor from which a state of a user is likely to be acquired from a circumference, the information processing device including: an acquiring unit configured to acquire information relating to a sensor which is likely to acquire a state of a user on the basis of notification information for allowing recognition of existence of a sensor located around the user.

14 Claims, 15 Drawing Sheets

(51) Int. Cl.
    *G06F 21/82*    (2013.01)
    *H04W 4/02*    (2018.01)
    *H04W 4/38*    (2018.01)
    *H03K 3/00*    (2006.01)
    *G06F 21/50*    (2013.01)
    *H04M 1/725*    (2006.01)
    *H04K 3/00*    (2006.01)

(52) U.S. Cl.
    CPC ....... *H04K 2203/14* (2013.01); *H04M 1/7253* (2013.01); *H04M 1/72569* (2013.01); *H04M 2250/12* (2013.01); *H04M 2250/52* (2013.01)

(56) References Cited

U.S. PATENT DOCUMENTS

| | | |
|---|---|---|
| 2013/0059534 A1* | 3/2013 | Sobalvarro ............ G06Q 30/02 455/41.1 |
| 2013/0325887 A1 | 12/2013 | Takaoka |
| 2014/0351337 A1 | 11/2014 | Pal et al. |

FOREIGN PATENT DOCUMENTS

| | | |
|---|---|---|
| JP | 2004-048524 A | 2/2004 |
| JP | 2011-159320 A | 8/2011 |
| KR | 2002-0016703 A | 3/2002 |

\* cited by examiner

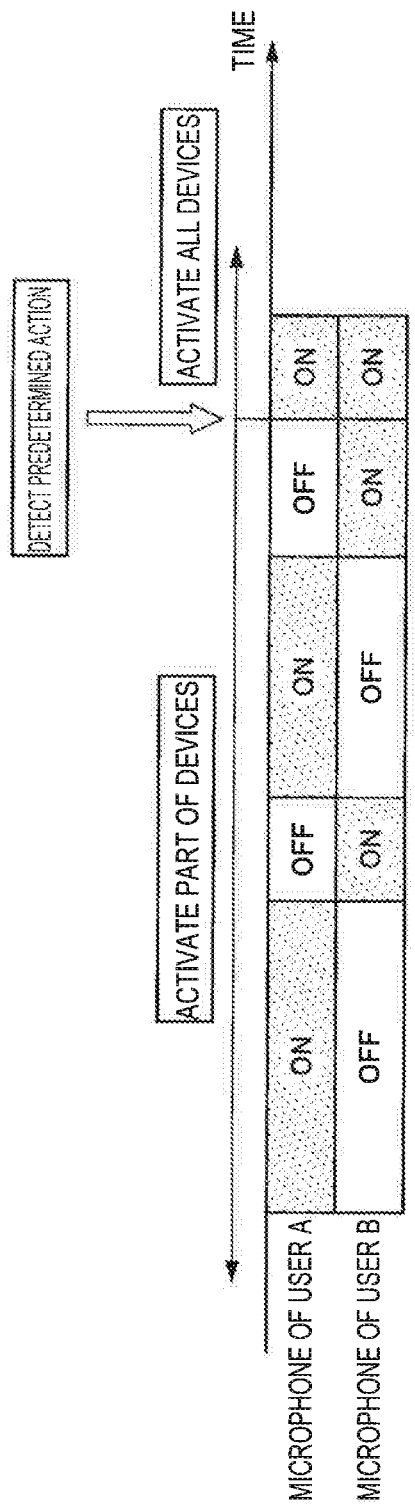

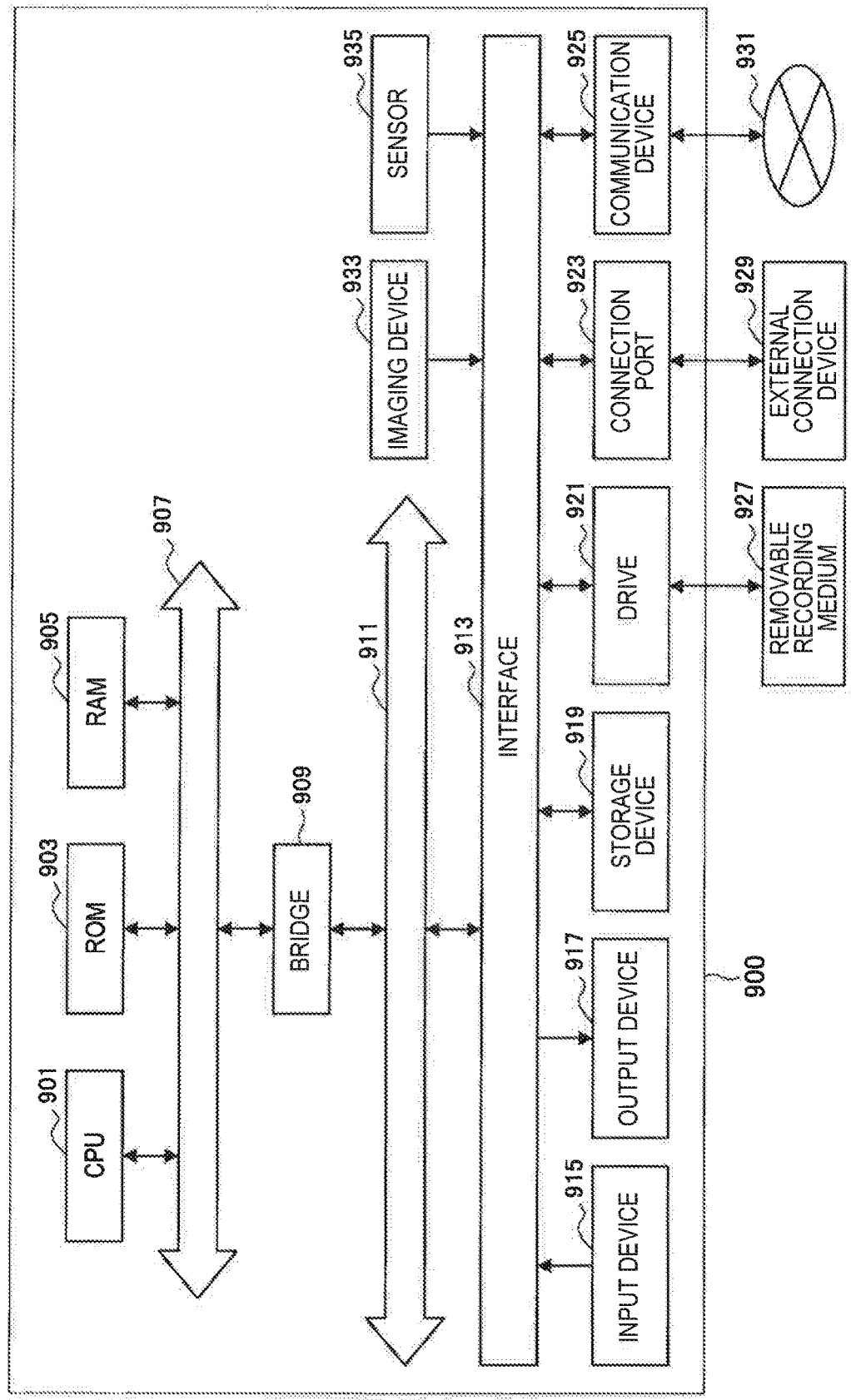

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2016/056480 (filed on Mar. 2, 2016) under 35 U.S.C. § 371, which claims priority to Japanese Patent Application No. 2015-119448 (filed on Jun. 12, 2015), which are all hereby incorporated by reference in their entirety.

TECHNICAL FIELD

The present disclosure relates to an information processing device, an information processing method, and a program.

BACKGROUND ART

In recent years, because various kinds of sensors are mounted on an information processing terminal such as a wearable terminal, and sensing can be constantly performed, many people get anxious about if photographs of themselves, their logs, or the like, are recorded without their permission while they are unaware of recording. Therefore, for example, as disclosed in Patent Literature 1, a technique has been proposed which protects privacy of a subject in real time by performing processing for protecting a field of view which should not be photographed on a photographed image of an imaging apparatus at high speed. Typically, at an information processing terminal, a notifying unit which gives a notification of functional states of a camera, a microphone, or the like, provided at the terminal so that the functional states can be visually confirmed from outside is provided.

CITATION LIST

Patent Literature

Patent Literature 1: JP H10-136344A

DISCLOSURE OF INVENTION

Technical Problem

However, because a notifying unit provided at an information processing terminal in related art is a lamp, or the like, which is simple, it is difficult to recognize a functional state of a sensor included in the information processing terminal in detail from outside.

Therefore, the present disclosure proposes a new and improved information processing device, information processing method and program which enable recognition that there is a sensor from which a state of a user is likely to be acquired from a circumference.

Solution to Problem

According to the present disclosure, there is provided an information processing device including: an acquiring unit configured to acquire information relating to a sensor which is likely to acquire a state of a user on the basis of notification information for allowing recognition of existence of a sensor located around the user.

In addition, according to the present disclosure, there is provided an information processing device including: a notifying unit configured to notify a user of potential information for notifying the user of existence of one or more sensors included in a target terminal located around the user and a possibility of acquiring a state of the user.

Furthermore, according to the present disclosure, there is provided an information processing method including: acquiring information relating to a sensor which is likely to acquire a state of a user on the basis of notification information for allowing recognition of existence of a sensor located around the user by a processor.

In addition, according to the present disclosure, there is provided a program causing a computer to function as an information processing device including: an acquiring unit configured to acquire information relating to a sensor which is likely to acquire a state of a user on the basis of notification information for allowing recognition of existence of a sensor located around the user.

Advantageous Effects of Invention

As described above, according to the present disclosure, it is possible to recognize that there is a sensor from which a state of a user is likely to be acquired from a circumference. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 14 is an explanatory diagram explaining another example of the power saving processing through cooperation of a plurality of devices.

FIG. 15 is a block diagram illustrating a hardware configuration example of an information processing device according to an embodiment of the present disclosure.

MODES FOR CARRYING OUT THE INVENTION

Figure 1:
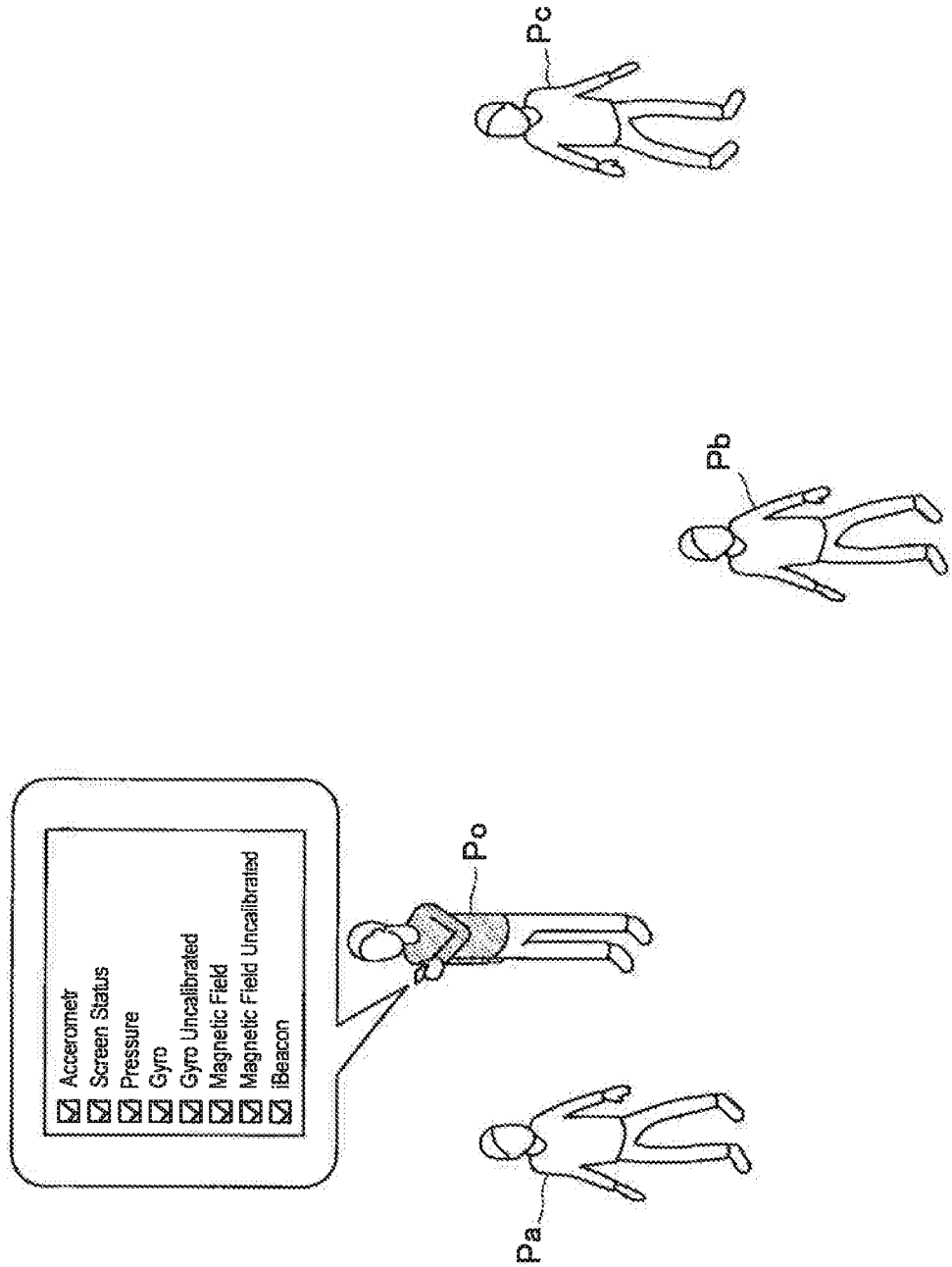
FIG. 1 is an explanatory diagram illustrating conditions where a functional state of a sensor included in a target terminal existing around an observer is directly acquired as one form of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. Outline
2. First embodiment (information acquisition from target terminal)
2.1. Outline
2.2. Functional configuration
(1) Target terminal
(2) Observer terminal
2.3. Information acquisition processing from target terminal
3. Second embodiment (information acquisition via server)
3.1. Outline
3.2. Functional configuration
(1) Target terminal
(2) Observer terminal
(3) Server
3.3. Information acquisition processing via server
4. Third embodiment (recognition of circumference)
4.1. Outline
4.2. Functional configuration
(1) Terminal
(2) Observer terminal
(3) Server
4.3. Processing of recognizing peripheral terminal
5. Use case
5.1. Declaration to circumference that own device does not perform measurement
5.2. Confirmation of content acquired at information processing terminal
5.3. Confirmation of content acquired at peripheral terminals
6. Hardware configuration
7. Supplement

1. Outline

Figure 10:
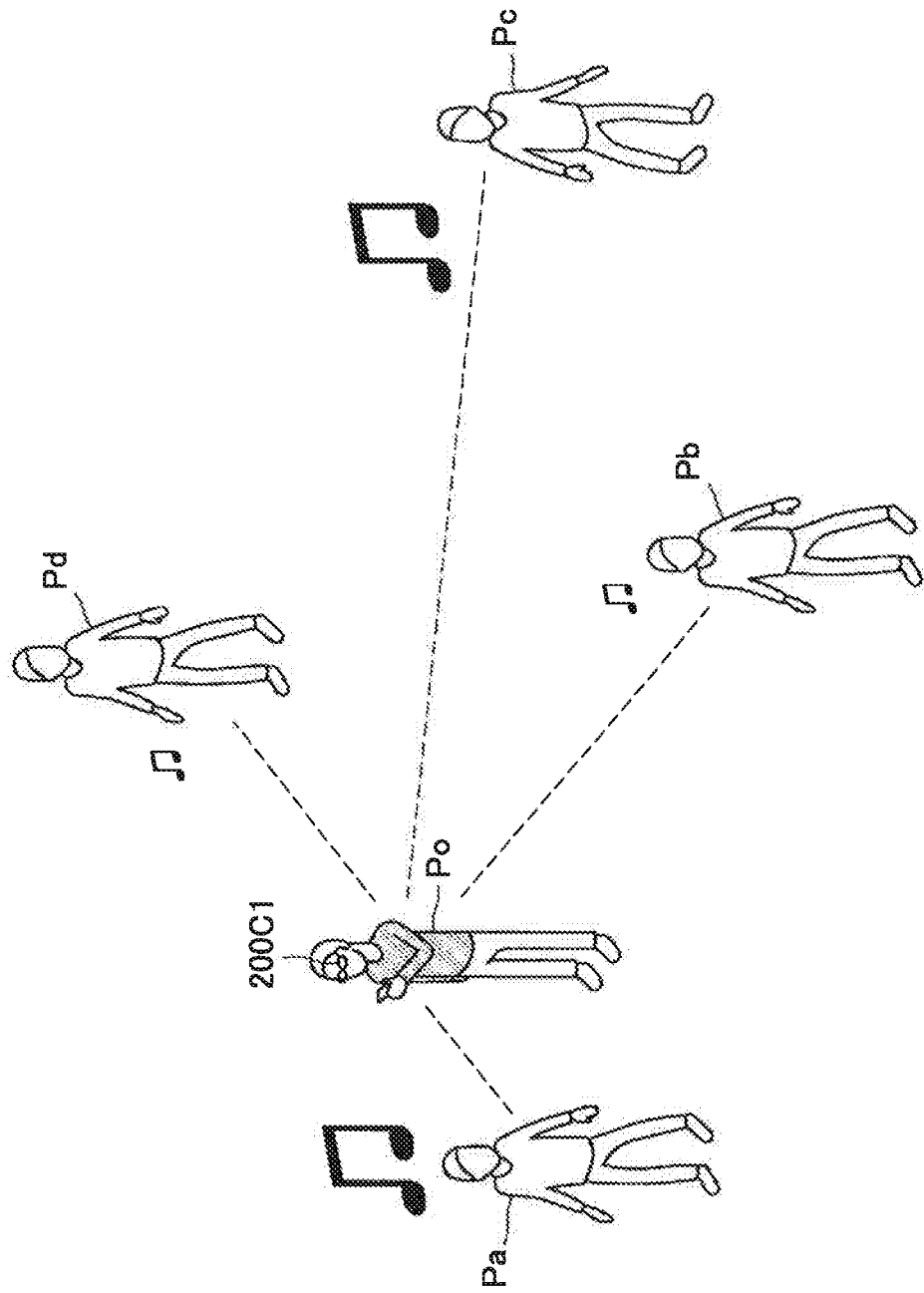
FIG. 10 is an explanatory diagram illustrating conditions where a possibility that a state of an observer may be acquired by a sensor of each target terminal is notified as a third embodiment of the present disclosure.

First, outline of an information processing system in the present disclosure will be described with reference to FIG. 1 and FIG. 10. Note that FIG. 1 is an explanatory diagram illustrating conditions where a functional state of a sensor included in a target terminal existing around an observer Po is directly acquired as one form in the present disclosure. FIG. 10 is an explanatory diagram illustrating conditions where a possibility that a state of the observer Po may be acquired by a sensor of each target terminal is notified as another form in the present disclosure.

An information processing system according to the present embodiment is a system which provides information relating to a sensor which is likely to acquire a state of a user (observer Po) to the user. If people located around the user use information processing terminals such as, for example, a smartphone, a wearable terminal, a digital camera and a recorder or put the information processing terminals into a state where the information processing terminals can be used, there is a possibility that a photograph or speech of the user may be acquired against the user's will. Alternatively, also in the case where a sensor provided in an environment, such as a surveillance camera, is working, there is a possibility that a state of the user may be acquired by the sensor. Therefore, the information processing system allows the user to recognize that there is a possibility that the state of the user may be acquired by a sensor located around the user.

As a configuration of such an information processing system, there can be the following two forms. One is a form in which the user him/herself notices an information processing terminal located around the user (or a person who may hold an information processing terminal or a position where an information processing terminal is provided), sets the information processing terminal as a target terminal and acquires operation setting information of a sensor of the terminal from the target terminal. For example, as illustrated in FIG. 1, this form corresponds to a case where persons Pa, Pb and Pc are located around the observer Po, and the observer Po acquires operation setting information of a sensor included in an information processing terminal of the person Pa using an observer terminal. In this form, it is possible to acquire detailed information relating to a sensor included in an information processing terminal which is focused on by the observer Po.

Another form is a form in which, while the user does not focus on a specific information processing terminal, the user is notified of a possibility that a state of the user may be acquired by an information processing terminal located around the user. For example, as illustrated in FIG. 10, the user is notified of existence of a terminal which is likely to acquire a state of the user although the user does not actively try to recognize information processing terminals located around the user. In FIG. 10, the user is notified of a possibility that a state of the user may be acquired by output of sound or a sound volume. By this means, the user can recognize that there is a possibility that the state of the user may be acquired.

In this manner, in the information processing system of the present disclosure, the user is allowed to recognize a sensor which is working as a sensor but does not acquire the state of the user, and a sensor which is not working as a sensor but can acquire the state of the user if the sensor works later, as well as a sensor which acquires the state of the user, as a sensor which is likely to acquire the state of the user. Each form will be described in detail below.

2. First Embodiment

[2.1. Outline]

Figure 2:
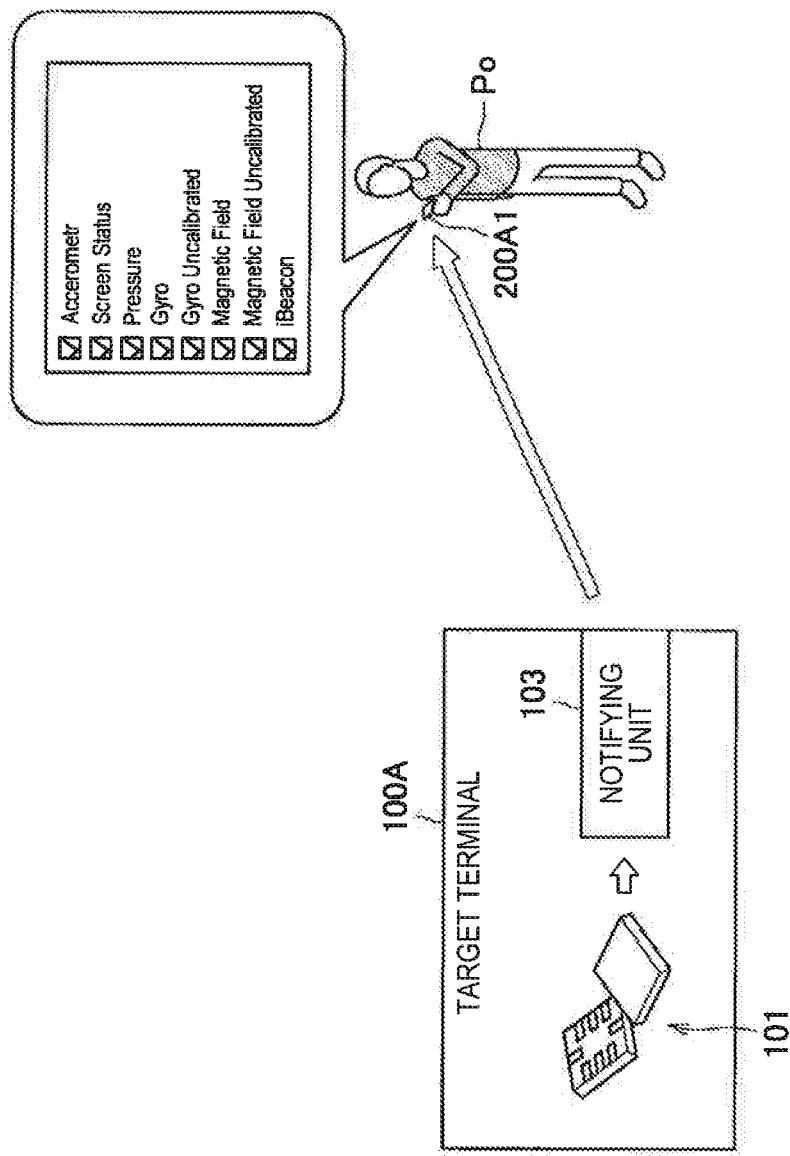
FIG. 2 is an explanatory diagram illustrating outline of an information processing system according to a first embodiment of the present disclosure.

First, outline of an information processing system according to a first embodiment of the present disclosure will be described on the basis of FIG. 2. Note that FIG. 2 is an explanatory diagram illustrating outline of the information processing system according to the present embodiment.

In the information processing system according to the present embodiment which corresponds to the above-described form in FIG. 1, the observer Po sets an information processing terminal located around the observer Po as a target terminal 100A and acquires information (here, operation setting information) relating to various kinds of sensors 101 included in the target terminal 100A. For example, as illustrated in FIG. 2, various kinds of sensors 101 such as, for example, a camera and a microphone are provided at the target terminal 100A. The target terminal 100A is configured to be able to acquire operation setting information such as ON/OFF states of these sensors 101, various kinds of setting states and cooperation with external equipment.

The target terminal 100A allows an external terminal to acquire operation setting information of various kinds of sensors 101 via a notifying unit 103. For example, the notifying unit 103 gives information for allowing the states of various kinds of sensors 101 to be directly acquired as notification information. The observer Po causes an acquiring unit of an observer terminal 200A1 to function and acquire the notification information notified by the target terminal 100A. Specifically, this case corresponds to a case where information that causes detailed information to be displayed by being decoded by corresponding application is used as the notification information, and the notification information is acquired by the observer terminal 200A1 such as an eyewear terminal and a smartphone being passed over the target terminal 100A.

Note that also in the case where corresponding application is not installed in the information processing terminal 200A1 or in the case where the observer Po does not hold the information processing terminal 200A1, a simple notifying unit such as a lamp may be provided at the target terminal 100A so that the observer Po can know operation setting of a sensor 101 of the target terminal 100A.

[2.2. Functional Configuration]

Figure 3:
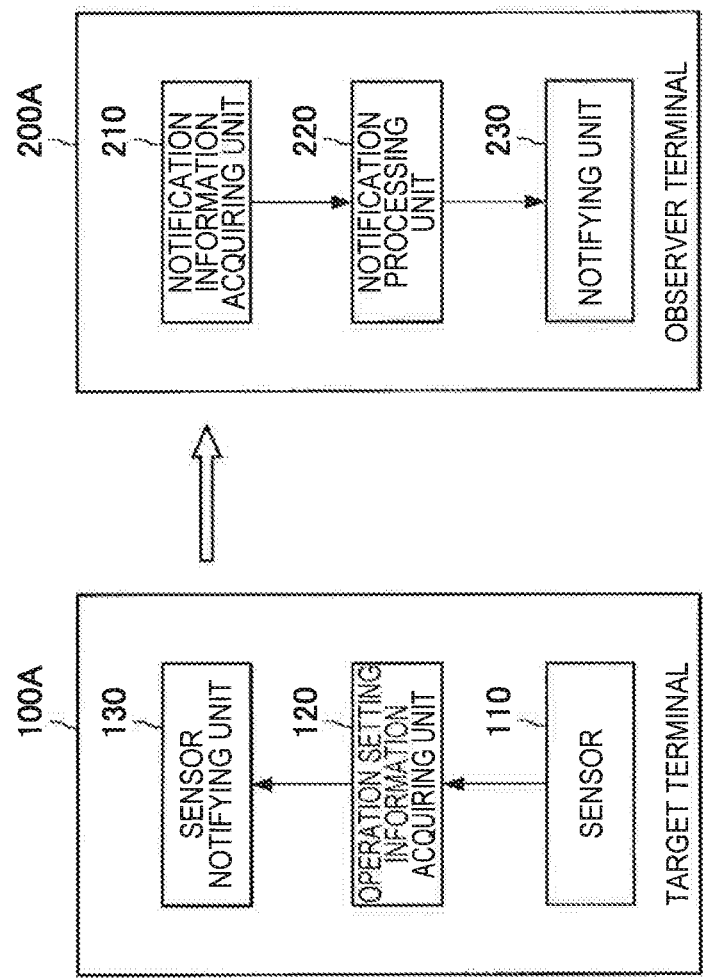
FIG. 3 is a functional block diagram illustrating a functional configuration of the information processing system according to the first embodiment of the present disclosure.

FIG. 3 illustrates a functional configuration of the information processing system according to the present embodiment. FIG. 3 is a functional block diagram illustrating the functional configuration of the information processing system according to the present embodiment. As illustrated in FIG. 3, the information processing system according to the present embodiment is configured with the target terminal 100A and the observer terminal 200A. The target terminal 100A is an information processing terminal from which an operation setting state of a sensor is to be acquired by the observer terminal 200A.

(1) Target Terminal

As illustrated in FIG. 3, the target terminal 100A is configured with a sensor 110, an operation setting information acquiring unit 120 and a sensor notifying unit 130. The sensor 110 which is one or more sensors (corresponding to various kinds of sensors 101 in FIG. 2) provided at the target terminal 100A, is, for example, a camera, a microphone, or the like.

The operation setting information acquiring unit 120 is a processing unit configured to acquire a setting state and an operation state of the sensor 110. The operation setting information acquiring unit 120 can acquire, for example, the following operation setting information for each sensor 110. The operation setting information acquiring unit 120 may acquire information specific to a sensor, such as, for example, a calibration implementation status of a geomagnetic sensor, other than the following operation setting information.

ON/OFF state of a sensor
sampling period
dynamic range/resolution
cutoff frequency In this event, the operation setting information acquiring unit 120 acquires information as described above for a sensor 110 "which is turned off" which is not currently working as well as a sensor 110 which is currently working. By this means, for example, when a possibility that the observer Po may be photographed by the target terminal 100A is determined, it is possible to distinguish between a state where "the target terminal 100A includes a camera, but the camera is not working" and a state where "the target terminal 100A does not include a camera itself".

Note that the operation setting information acquiring unit 120 may acquire, for example, information relating to notifying means of notification information which can be executed at the target terminal 100A in addition to the operation setting information of the sensor 110. Examples of the information relating to the notifying means can include the following. Note that if an available path is known by temporal authority or intimacy, these can be applied as notifying means.

ON/OFF state of a phone
whether there is a speaker which can be operated from the target terminal around the target terminal
whether there is a display which can be operated from the target terminal around the target terminal
whether a bed can be wobbled The operation setting information of the sensor 110 acquired by the operation setting information acquiring unit 120 is output to the sensor notifying unit 130.

The sensor notifying unit 130 is a notifying unit which gives notification information for allowing the operation setting information of the sensor 110 to be acquired from outside of the target terminal 100A. Examples of a case where notification information which requires to be decoded at the observer terminal 200A is given include the following provision of information by turning on/off a lamp (for example, Morse, AM modulation, or the like)
regular radio wave transmission
regular visible light emission
display of a barcode, or the like, on a sub-display Further, the sensor notifying unit 130 may give notification information which allows recognition even if application enabling acquisition and recognition of the notification information is not installed in the terminal or the observer Po does not hold the terminal, other than notification information which is required to be decoded.

Figure 4:
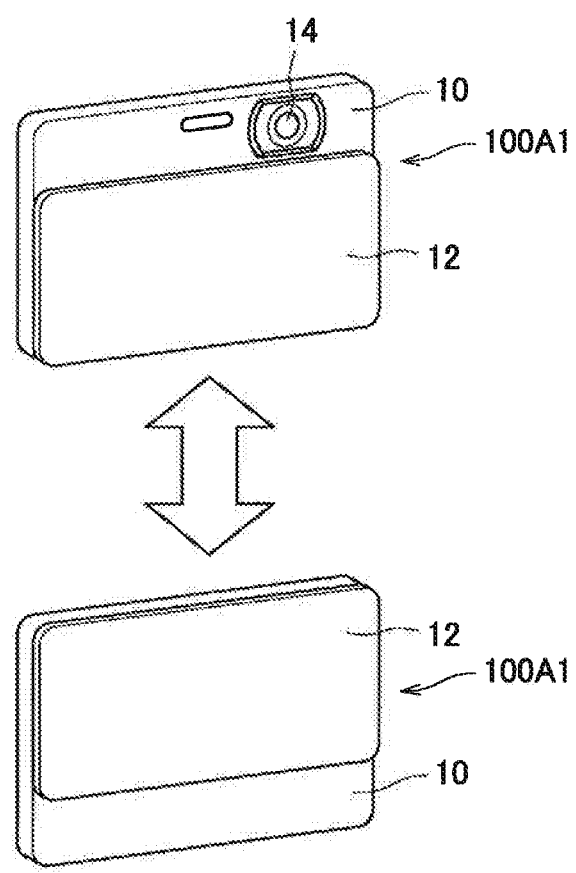
FIG. 4 is an explanatory diagram illustrating an example where an operation state of a camera is notified from physical motion of a terminal.

For example, it is also possible to display notification information in which the operation setting information of the sensor 110 is made a character, an icon, or the like, on a sub-display, or it is also possible to regularly emit sound according to the operation setting information of the sensor 110. Further, as illustrated in FIG. 4, if the target terminal 100A is a camera 100A1, a cover 12 of a chassis 10 may open when the observer Po is photographed using an imaging unit 14, and the cover 12 of the chassis 10 may be closed when the observer Po is not photographed using the imaging unit 14 so as to conceal the imaging unit 14. Alternatively, when the observer Po is not photographed using the imaging unit 14, an imaging direction of the camera may be physically directed to downward. By giving such notification information, the user can recognize the operation setting information of the sensor without utilizing a predetermined terminal.

(2) Observer Terminal

Next, as illustrated in FIG. 3, the observer terminal 200A includes a notification information acquiring unit 210, a notification processing unit 220 and a notifying unit 230.

The notification information acquiring unit 210 is an acquiring unit which acquires the notification information notified by the target terminal 100A. The notification information acquiring unit 210 functions as a reader unit in the case where the notification information of the target terminal 100A is information such as a barcode, which requires to be decoded. The notification information acquiring unit 210 outputs the acquired notification information to the notification processing unit 220.

The notification processing unit 220 performs processing of making the operation setting information of the sensor 110 of the target terminal 100A information which can be notified, on the basis of the notification information. The notification processing unit 220, for example, decodes the acquired notification information to acquire information relating to operation and setting relating to at least one sensor 110 included in the target terminal 100A. The acquired information is output to the notifying unit 230.

The notifying unit 230 notifies the user (observer Po) of the operation setting information of at least one sensor 110 included in the target terminal 100A.

The notifying unit 230 is, for example, various kinds of output devices such as a display, a speaker and a vibrator. For example, in the case where the user is notified of the operation setting information via a display, the user may be notified of functions (sensors) of the target terminal 100A and operation states of the sensors which are put together in a form of a list of functions as illustrated in FIG. 2.

[2.3. Information Acquisition Processing from Target Terminal]

Figure 5:
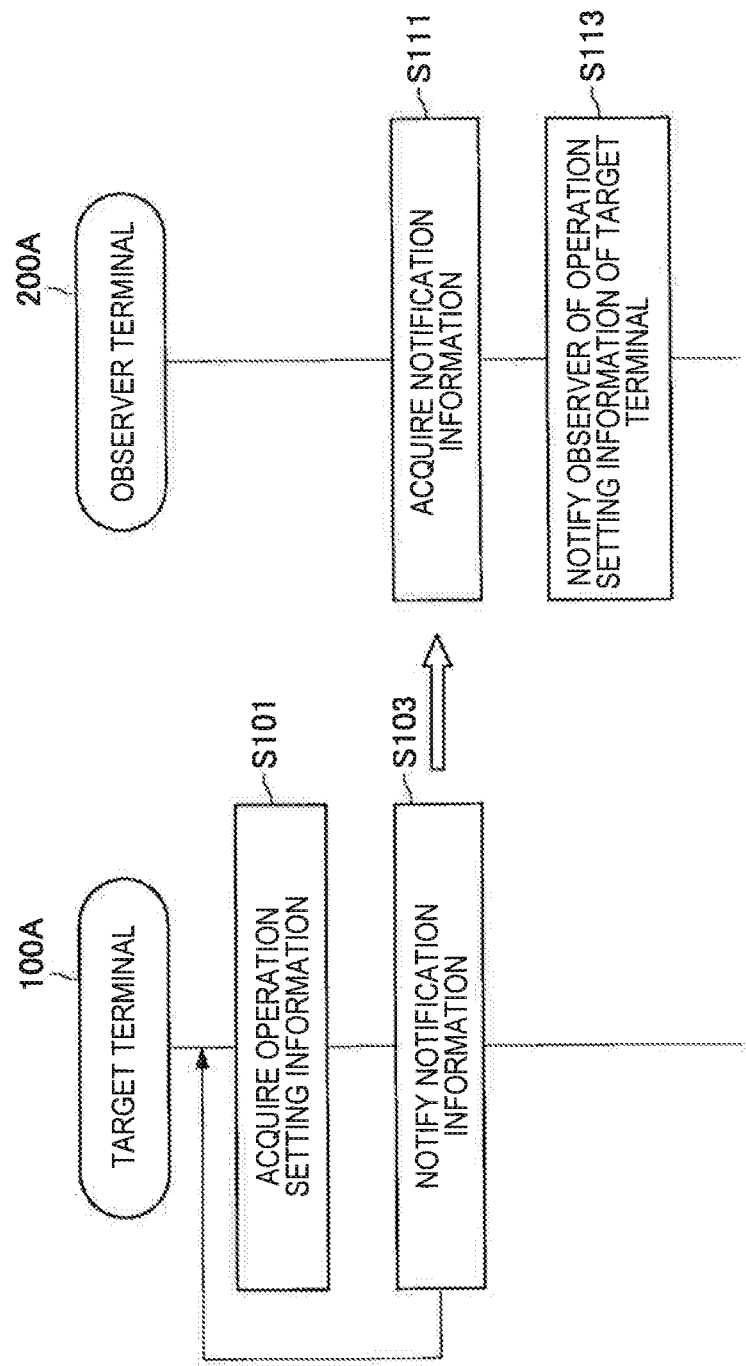
FIG. 5 is a timing chart illustrating information acquisition processing according to the first embodiment of the present disclosure.
Figure 6:
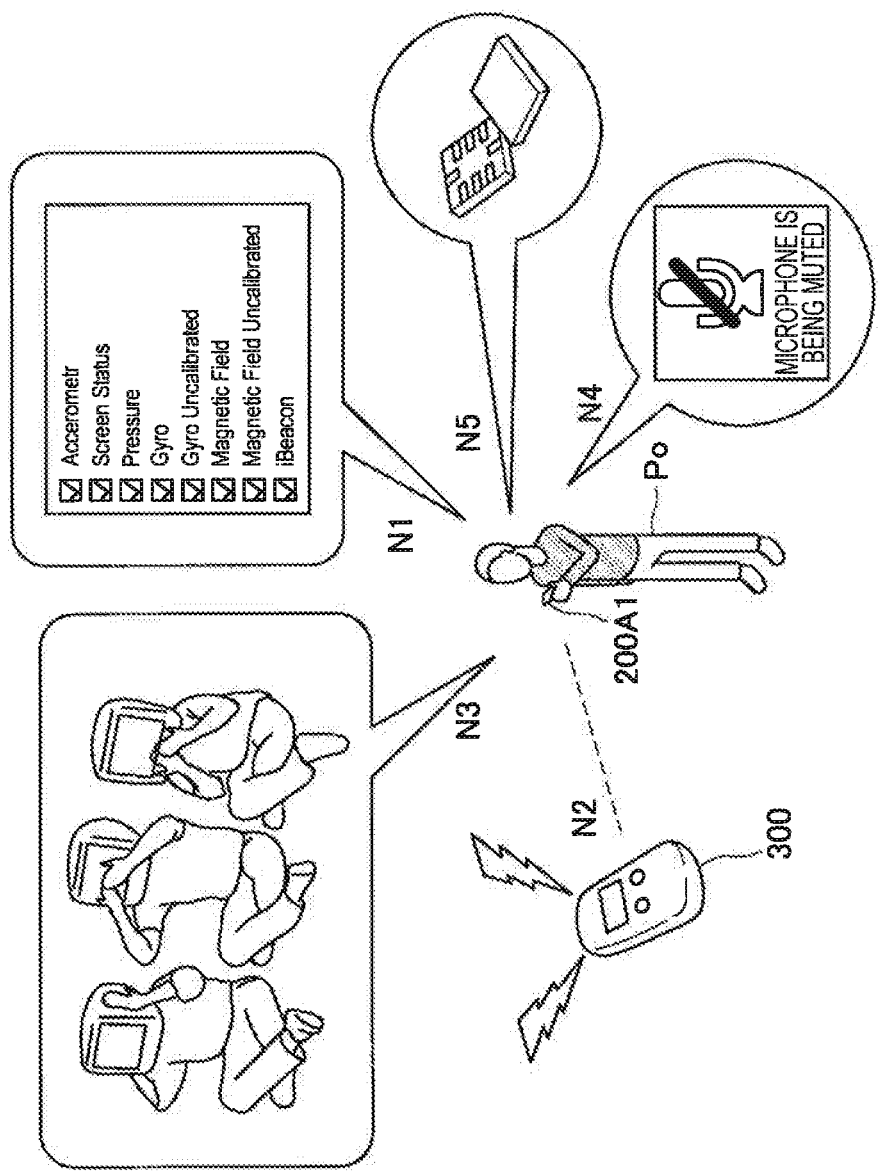
FIG. 6 is an explanatory diagram illustrating a notification example of operation setting information of a sensor of the target terminal at an observer terminal.

Information acquisition processing of the target terminal 100A will be described below on the basis of FIG. 5 and FIG. 6. Note that FIG. 5 is a timing chart illustrating information acquisition processing according to the present embodiment. FIG. 6 is an explanatory diagram illustrating a notification example of the operation setting information of the sensor of the target terminal 100A at the observer terminal 200A.

As illustrated in FIG. 5, the operation setting information of the sensor 110 of the target terminal 100A is acquired within the target terminal 100A at a predetermined timing (S101). When the operation setting information is acquired by the operation setting information acquiring unit 120, notification is given to outside by the sensor notifying unit 130 as notification information (S103). Processing of step S101 and S103 is repeatedly performed.

Meanwhile, if there is an information processing terminal which is likely to acquire a state of the observer Po near the observer Po, the observer Po sets this information processing terminal as the target terminal 100A and acquires the operation setting information of the sensor 110 of the target terminal 100A. Here, the observer Po may visually find the target terminal 100A, or may use an information processing terminal of the observer Po (observer terminal 200A), or the like, to search for an information processing terminal which can be the target terminal 100A.

Searching for the information processing terminal by the observer terminal 200A may be, for example, performed within a view angle of the observer Po during activation of designated application. In this event, search result information notified by the application may be displayed on a display of the observer terminal 200A. It is only necessary to display only an information processing terminal in which at least designated sensor is activated among the detected information processing terminals in the search result information, and it is also possible to display an information processing terminal in which the sensor is not activated. Further, in the case where the operation state of the designated sensor changes from activation to stop, it is also possible to give a notification while emphasizing change of the operation state by, for example, outputting sound or temporarily changing display color relating to the sensor.

Further, concerning information outside the visual angle of the observer Po, for example, it is also possible to give a notification as to whether there is an information processing terminal in which a designated sensor is activated within a predetermined range from the observer Po by utilizing location information which can be acquired from a server. Here, in the case where an information processing terminal in which a designated sensor is activated is detected only outside the visual angle of the observer Po, it is also possible to give a notification to promote the observer Po to search the circumference.

Searching for the information processing terminal by the observer terminal 200A may be constantly implemented, or, as power saving measures, location information may be regularly acquired from a server and screened, and, in the case where an information processing terminal is detected around the observer Po, a camera of the observer terminal 200A may be activated.

Still further, the observer terminal 200A may perform search processing preferentially over processing of other application which has already run on the observer terminal 200A on the basis of an instruction from the observer Po. For example, in the case where the observer Po inputs an inquiry of "is there a surveillance camera around here?" to the observer terminal 200A, search processing is executing while interrupting other processing. For example, in the case where it is detected that the observer Po takes action which is not desired to be photographed, such as change of cloths, it is necessary to promptly confirm whether there is a sensor which can acquire a state of the observer Po around the observer Po. In such a case, the interruption processing is effective.

If the target terminal 100A from which the operation setting information of the sensor is to be acquired is determined through such search result information of the information processing terminal by the observer terminal 200A, detection by the user, or the like, the user acquires the notification information using the observer terminal 200A (S111). For example, in the case where the observer Po wears an eyewear terminal as the observer terminal 200A, the observer Po can acquire the notification information from the target terminal 100 by shooting a look at the target terminal 100A or moving to a region where the observer terminal 200A can communicate with the target terminal 100A.

Then, when the observer terminal 200A acquires the notification information from the target terminal 100A, the observer terminal 200A decodes the notification information and notifies the observer Po of the operation setting information of the sensor 110 of the target terminal 100A (S113). A notification example of the operation setting information of the sensor 110 of the target terminal 100A at the observer terminal 200A is illustrated in FIG. 6. As illustrated in FIG. 6, the observer terminal 200A may notify the observer Po of the operation setting information by displaying functions (sensors) of the target terminal 100A with a character string (N1), or may notify the observer Po of the operation setting information by emitting sound, or the like (N2). Alternatively, the observer terminal 200A may notify the observer Po of the operation setting information by displaying the anthropomorphic information (N3), may notify the observer Po using an icon (N4) or may notify the observer Po through animation display by superimposing an image on a screen (N5). Note that the notification examples of the notification information at the observer terminal 200A are not limited to these.

Further, the observer terminal 200A may notify the user of location and a state of the target terminal 100A along with notification of the operation setting information of the sensor. By this means, for example, in the case where a plurality of information processing terminals 100A exist within the visual angle, by displaying identification information of each information processing terminal 100A and the notification information together at a display unit, the observer Po can distinguish these information processing terminals 100A at a glance. Alternatively, in the case where the information processing terminal 100A is detected outside the visual angle of the user, for example, speech such as "there is reaction in a direction of 10:00" may be output, or animation indicating existence of the information processing terminal 100A may be displayed in the vicinity of the boundary within the visual angle.

The information processing system according to the first embodiment of the present disclosure has been described above. According to the present embodiment, it is possible to recognize that there is a sensor from which a state of the user is likely to be acquired from the circumference.

3. Second Embodiment

[3.1. Outline]

Figure 7:
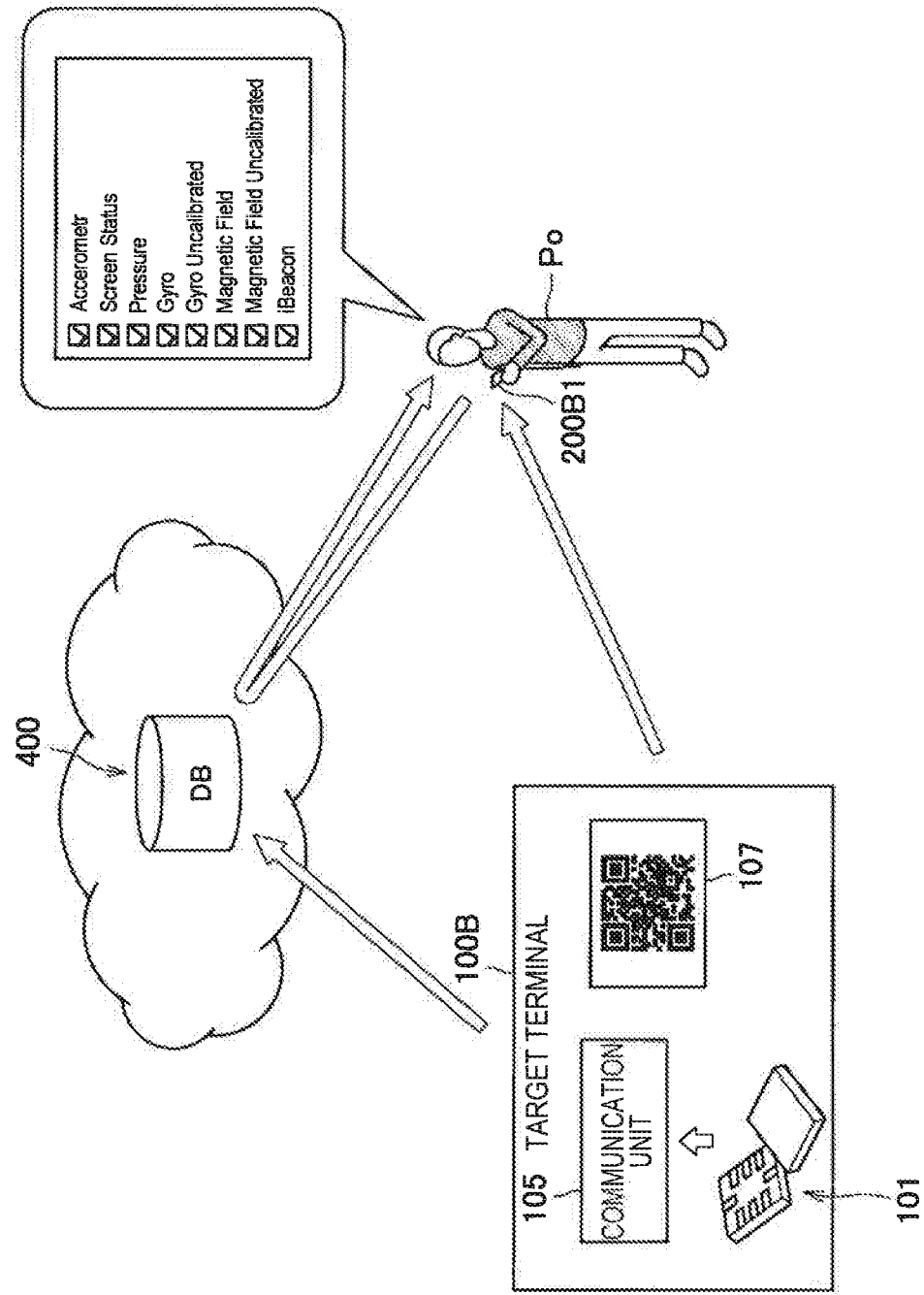
FIG. 7 is an explanatory diagram illustrating outline of an information processing system according to a second embodiment of the present disclosure.

Next, outline of an information processing system according to the second embodiment of the present disclosure will be described on the basis of FIG. 7. Note that FIG. 7 is an explanatory diagram illustrating outline of the information processing system according to the present embodiment.

In the information processing system according to the present embodiment which also corresponds to the above-described form in FIG. 1, the observer Po sets an information processing terminal located around the observer Po as a target terminal 100B and acquires information (here, operation setting information) relating to various kinds of sensors 101 included in the target terminal 100B. The information processing system according to the present embodiment is different from that in the first embodiment in that an observer terminal 200B1 acquires operation setting information of a sensor 101 of the target terminal 100B via a server 400B which manages the operation setting information of the sensor 101 of the target terminal 100B.

That is, the target terminal 100A transmits the operation setting information of various kinds of sensors 101 to an external server 400B via the communication unit 105 at a predetermined timing. Meanwhile, as illustrated in FIG. 7, the target terminal 100B notifies the observer terminal 200B1 of identification information 107 for identifying the target terminal 100B.

The observer Po causes the acquiring unit of the observer terminal 200B1 to acquire identification information notified by the target terminal 100B. Then, the observer terminal 200B1 transmits the acquired identification information to the server 400B and requests transmission of operation setting information of the sensor included in the corresponding target terminal 100B. The server 400B acquires the operation setting information of the sensor 101 included in the corresponding target terminal 100B from a storage unit on the basis of the identification information received from the observer terminal 200B1 and outputs the operation setting information to the observer terminal 200B. By this means, the observer terminal 200B1 can confirm the operation setting information of the sensor 101 included in the target terminal 100B.

[3.2. Functional Configuration]

Figure 8:
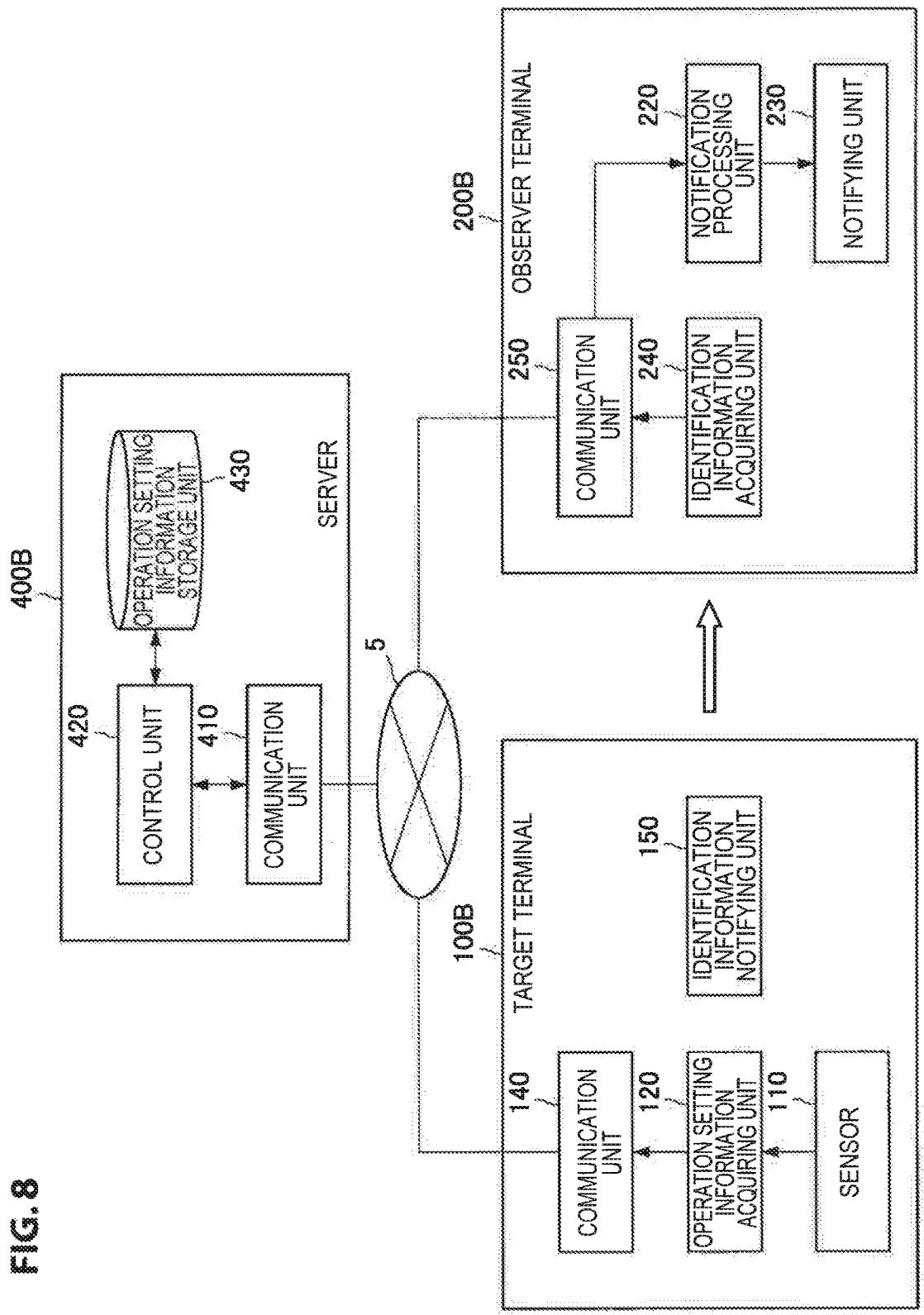
FIG. 8 is a functional block diagram illustrating a functional configuration of the information processing system according to the second embodiment of the present disclosure.

FIG. 8 illustrates a functional configuration of the information processing system according to the present embodiment. FIG. 8 is a functional block diagram illustrating the functional configuration of the information processing system according to the present embodiment. As illustrated in FIG. 8, the information processing system according to the present embodiment is configured with the target terminal 100B, the observer terminal 200B and the server 400B. The target terminal 100B is an information processing terminal from which an operation setting state of a sensor is to be acquired by the observer terminal 200B. Note that, in the following description, detailed description of functional units having the same configuration and functions as those of the first embodiment will be omitted.

(1) Target Terminal

As illustrated in FIG. 8, the target terminal 100B is configured with the sensor 110, the operation setting information acquiring unit 120, the communication unit 140 and the identification information notifying unit 150. The sensor 110 and the operation setting information acquiring unit 120 have the same configurations and functions as those in FIG. 3. However, the operation setting information acquiring unit 120 outputs the operation setting information to the communication unit 140.

The communication unit 140 is a processing unit which performs transmission/reception of information between the target terminal 100B and the server 400B via a network 5. The communication unit 140 transmits the operation setting information of the sensor 110 acquired by the operation setting information acquiring unit 120 to the server 400B which is connected via the network 5.

The identification information notifying unit 150 notifies the observer terminal 200B of identification information for identifying the target terminal 100B. Here, as the identification information, for example, an identifier such as a two-dimensional barcode, sound and a signal specific to the target terminal 100B may be used. The identification information notified by the identification information notifying unit 150 is acquired by an identification information acquiring unit 240 of the observer terminal 200B. Note that, as the identification information, information from which a person can be specified, such as, for example, face of a person who uses the target terminal 100B, other than the above-described identifier may be used.

(2) Observer Terminal

Next, as illustrated in FIG. 8, the observer terminal 240B includes a notification processing unit 220, a notifying unit 230, an identification information acquiring unit 240 and a communication unit 250. The notification processing unit and the notifying unit 230 have the same configurations and functions as those in FIG. 3.

The identification information acquiring unit 240 acquires the identification information notified from the identification information notifying unit 150 of the target terminal 100B. The identification information acquiring unit 240 acquires, for example, a two-dimensional barcode, identification sound or an identification signal specific to the target terminal 100B, or the like, and acquires target terminal information for specifying the target terminal 100B. The target terminal information is information associated with the identification information notified by the target terminal 100B and is information which is uniquely acquired even if types of the identification information are different, for example, a two-dimensional barcode and identification sound. The identification information acquiring unit 240 outputs the target terminal information acquired from the identification information to the communication unit 250.

The communication unit 250 is a processing unit which performs transmission/reception of information between the observer terminal 200B and the server 400B via the network 5. The communication unit 250, for example, transmits the target terminal information acquired from the identification information acquiring unit 240 to the server 400B. Further, the communication unit 250, for example, outputs the operation setting information of the sensor 110 included in the target terminal 100B received from the server 400B to the notification processing unit 220.

(3) Server

The server 400B is a management server which manages the operation setting information of the sensor 110 of the information processing terminal 100 connected via the network 5. As illustrated in FIG. 8, the server 400B is configured with a communication unit 410, a control unit 420 and an operation setting information storage unit 430.

The communication unit 410 is a processing unit which performs transmission/reception of information between the information processing terminal such as the target terminal 100B and the observer terminal 200B and the server 400B via the network 5. The communication unit 410, for example, outputs the operation setting information of the sensor 110 transmitted from the target terminal 100B to the control unit 420. Further, the communication unit causes the control unit 420 to acquire the operation setting information of the sensor of the designated target terminal 100B in response to a request from the observer terminal 200B and transmits the acquired operation setting information to the observer terminal 200B.

The control unit 420 controls the whole functions of the server 400B. The control unit 420 records the operation setting information of the sensor 110 transmitted from the target terminal 100B in the operation setting information storage unit 430 and acquires the operation setting information of the sensor 100 of the target terminal 100B associated with the designated target terminal information.

The operation setting information storage unit 430 is a storage unit which stores the operation setting information of the sensor 110 included in the information processing terminal 100 transmitted to the server 400B. The operation setting information storage unit 430 stores the operation setting information of the sensor in association with the target terminal information for, for example, each information processing terminal 100.

[3.3. Information Acquisition Processing Via Server]

Operation setting information acquisition processing of the sensor 110 of the target terminal 100B via the server will be described below on the basis of FIG. 9. Note that FIG. 9 is a timing chart illustrating information acquisition processing according to the present embodiment.

Figure 9:
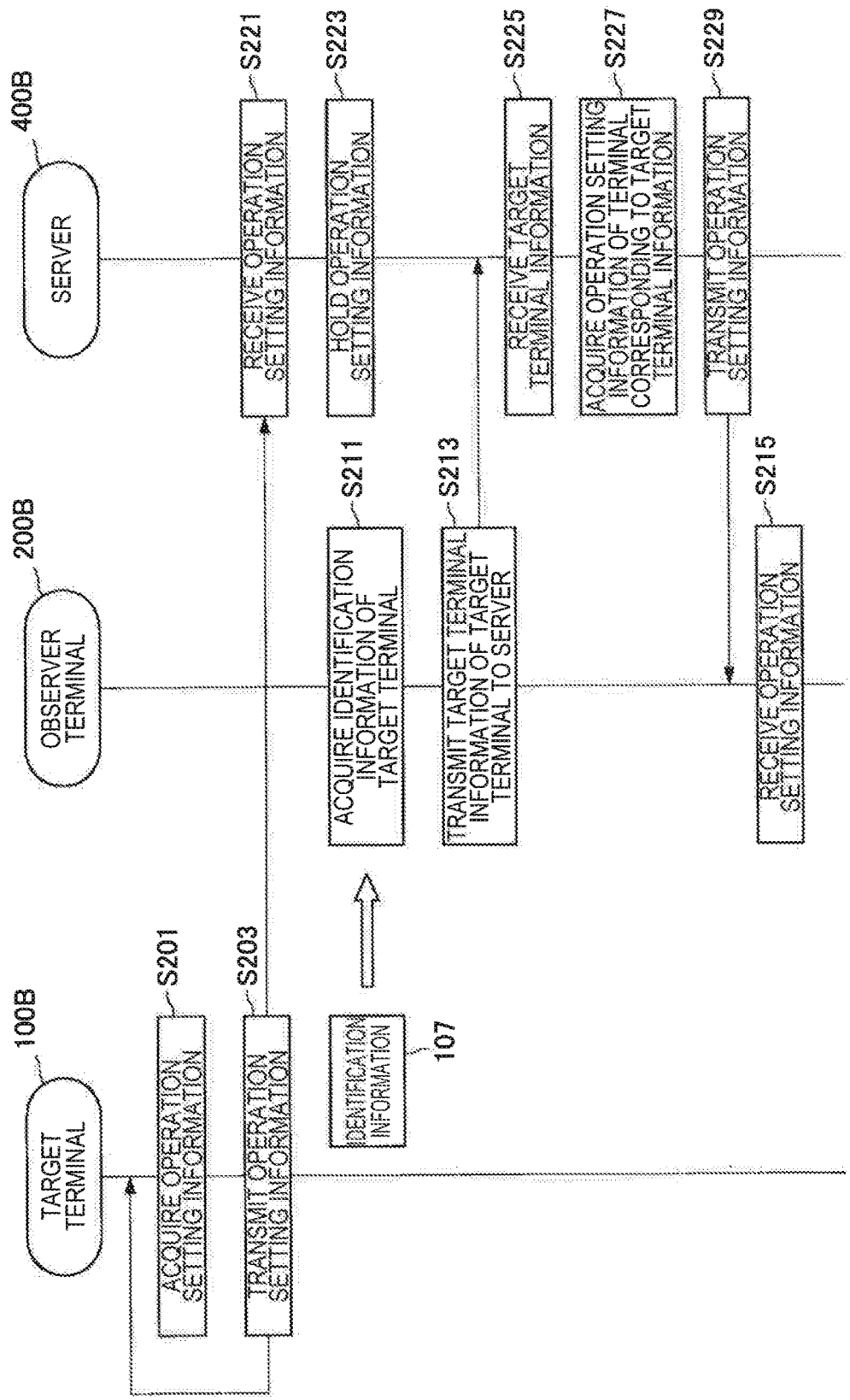
FIG. 9 is a timing chart illustrating information acquisition processing according to the second embodiment of the present disclosure.

As illustrated in FIG. 9, the operation setting information of the sensor 110 of the target terminal 100B is acquired within the target terminal 100B at a predetermined timing (S201). When the operation setting information is acquired by the operation setting information acquiring unit 120, the operation setting information is transmitted to the server 400B by the communication unit 140 (S203). When the server 400B receives the operation setting information from the target terminal 100B (S221), the operation setting information is recorded in the operation setting information storage unit 430 by the control unit 420 (S223). Note that the processing of step S201 and S203 is repeatedly performed, and the processing of step S221 and S223 is executed at a timing when the server 400B receives the operation setting information.

Meanwhile, when there is an information processing terminal which is likely to acquire a state of the observer Po near the observer Po, the observer Po sets this information processing terminal as the target terminal 100B and tries to acquire the operation setting information of the sensor 110 of the target terminal 110B. Here, the observer Po may visually find the target terminal 100B or may search for an information processing terminal which can be the target terminal 100B using the information processing terminal (observer terminal 200B), or the like, of the observer Po. Search for an information processing terminal by the observer terminal 200B can be performed using various kinds of methods described in the first embodiment.

If the target terminal 100B from which the operation setting information of the sensor is to be acquired is determined, the user acquires identification information 107 from the target terminal 100B using the identification information acquiring unit 240 of the observer terminal 200B (S211). When the observer terminal 200B acquires the identification information from the target terminal 100B, the observer terminal 200B acquires target terminal information which is information specific to the target terminal from the identification information and transmits the target terminal information to the server 400B via the communication unit 250 (S213).

When the server 400B receives the target terminal information from the observer terminal 200B (S225), the operation setting information associated with the target terminal information is acquired from the operation setting information storage unit 430 by the control unit 420 (S227). The server 400B transmits the acquired operation setting information to the observer terminal 200B (S229). The observer terminal 200B receives the operation setting information from the server 400B (S215) and notifies the observer Po. Notification to the observer Po may be performed using various kinds of notification methods described in the first embodiment.

In this manner, also in the information processing system according to the present embodiment, as with the case of the first embodiment, it is possible to recognize that there is a sensor which is likely to acquire a state of a user from the circumference. The information processing system according to the second embodiment of the present disclosure has been described above.

4. Third Embodiment

[4.1. Outline]

Outline of the information processing system according to the third embodiment of the present disclosure will be described next on the basis of FIG. 10. While, in the information processing system according to the present embodiment illustrated in FIG. 10, the user does not focus on a specific information processing terminal as described above, the user is notified of a possibility that a state of the user may be acquired by an information processing terminal located around the user. For example, as illustrated in FIG. 10, the user is notified of existence of a terminal which is likely to acquire the state of the user as potential information even if the user does not actively recognize an information processing terminal located around the user.

That is, in the case where there are persons Pa, Pb, Pc and Pd around the observer Po and the persons Pa, Pb, Pc and Pd hold information processing terminals including sensors which can acquire a state of the observer Po, for example, display indicating the existence may be output as potential information at a display unit of the observer terminal 200C1 held by the observer Po. Further, it is also possible to superimpose alarm for notifying the observer Po of existence from a direction of an information processing terminal held by each of the persons Pa, Pb, Pc and Pd. In this event, a volume may be made small in the case where a sensor which is likely to acquire the state of the observer Po is not activated, while a volume is made large in the case where a sensor which is likely to acquire the state of the observer is activated and a person who holds the sensor faces the observer Po. By this means, the observer Po can recognize a level of the possibility as well as a possibility that the state of the observer Po may be acquired. Necessity of output of the notification sound and a volume of the notification sound can be regarded as a piece of the potential information.

[4.2. Functional Configuration]

Figure 11:
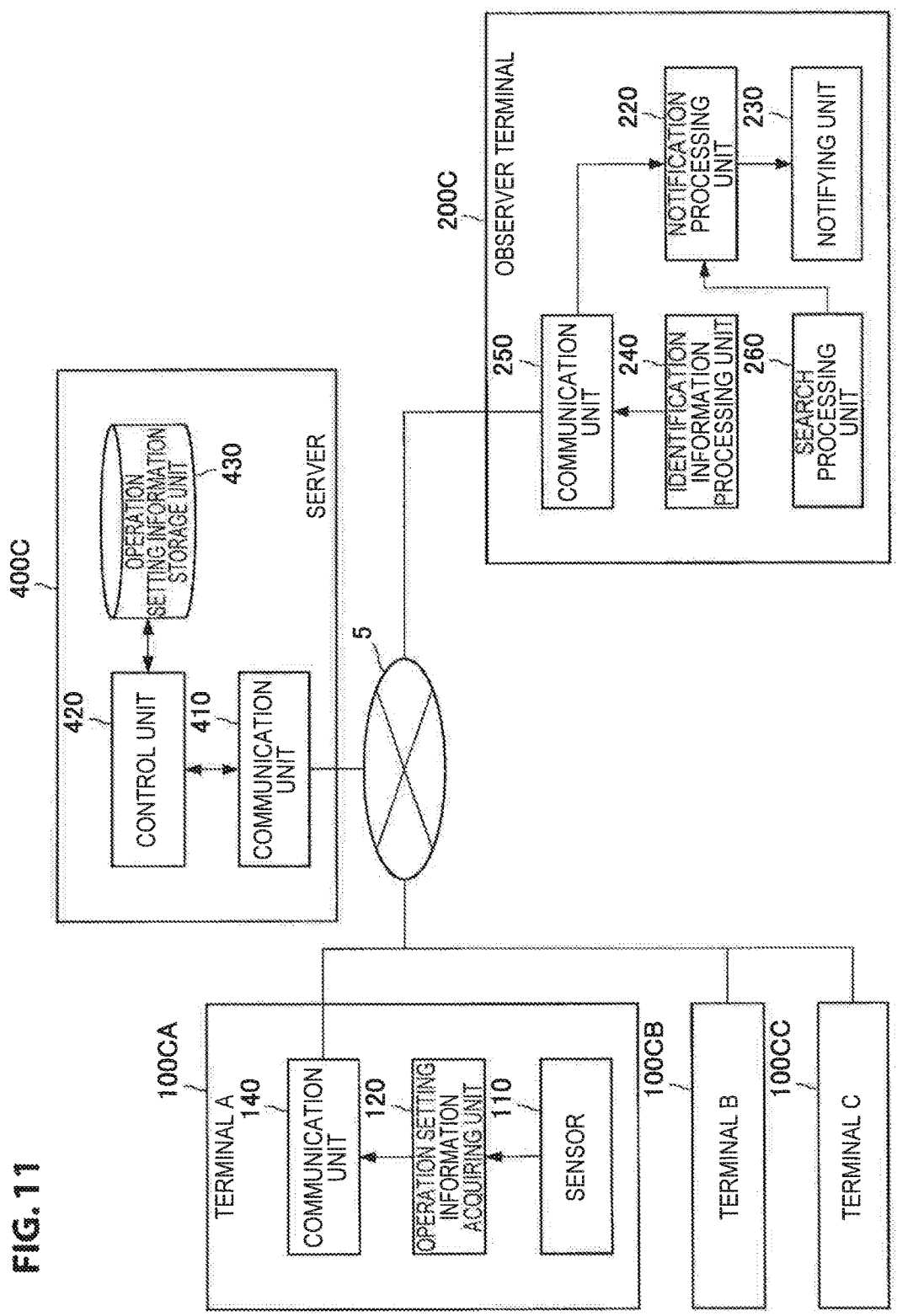
FIG. 11 is a functional block diagram illustrating a functional configuration of an information processing system according to the third embodiment of the present disclosure.

FIG. 11 illustrates a functional configuration of the information processing system according to the present embodiment. FIG. 11 is a functional block diagram illustrating the functional configuration of the information processing system according to the present embodiment. As illustrated in FIG. 11, the information processing system according to the present embodiment is configured with terminals 100CA to 100CC, an observer terminal 200C and a server 400C. The terminals 100CA to 100CC are peripheral terminals located around the observer terminal 200C, and are information processing terminals which can be target terminals from which operation setting states of sensors are to be acquired. Note that, in the following description, detailed description of functional units having the same configurations and functions as those in the first embodiment and the second embodiment will be omitted.

(1) Terminal

As illustrated in FIG. 11, each of the terminals 100CA to 100CC is configured with a sensor 110, an operation setting information acquiring unit 120 and a communication unit 140. The sensor 110, the operation setting information acquiring unit 120 and the communication unit 140 have the same configurations and functions as those in FIG. 8. Note that, while the terminals 100CA to 100CC are not illustrated in FIG. 11, the identification information notifying unit 150 may be included.

(2) Observer Terminal

Next, as illustrated in FIG. 11, the observer terminal 200C includes a notification processing unit 220, a notifying unit 230, an identification information acquiring unit 240, a communication unit 250 and a search processing unit 260. The notification processing unit 220, the notifying unit 230, the identification information acquiring unit 240 and the communication unit 250 have the same configurations and functions as those in FIG. 11.

The search processing unit 260 is a processing unit which detects the terminals 100CA to 100CC located around the observer Po. The search processing unit 260 executes various kinds of search processing as described in the above-described first embodiment, and when the search processing unit 260 detects the terminals 100CA to 100CC located around the observer Po, the search processing unit 260 outputs a detection result to the notification processing unit 220 to notify the user via the communication unit 230.

(3) Server

The server 400C is a management server which manages the operation setting information of the sensor 110 of the information processing terminal 100 connected via the network 5. As illustrated in FIG. 11, the server 400C is configured with a communication unit 410, a control unit 420 and an operation setting information storage unit 430. The server 400C has the same configuration and functions as those in FIG. 8.

[4.3. Processing of Recognizing Peripheral Terminal]

Processing of recognizing a peripheral terminal 100C of the observer terminal Po and operation setting information acquisition processing of the sensor of the terminal will be described below on the basis of FIG. 12. Note that FIG. is a timing chart illustrating the information acquisition processing according to the present embodiment.

Figure 12:
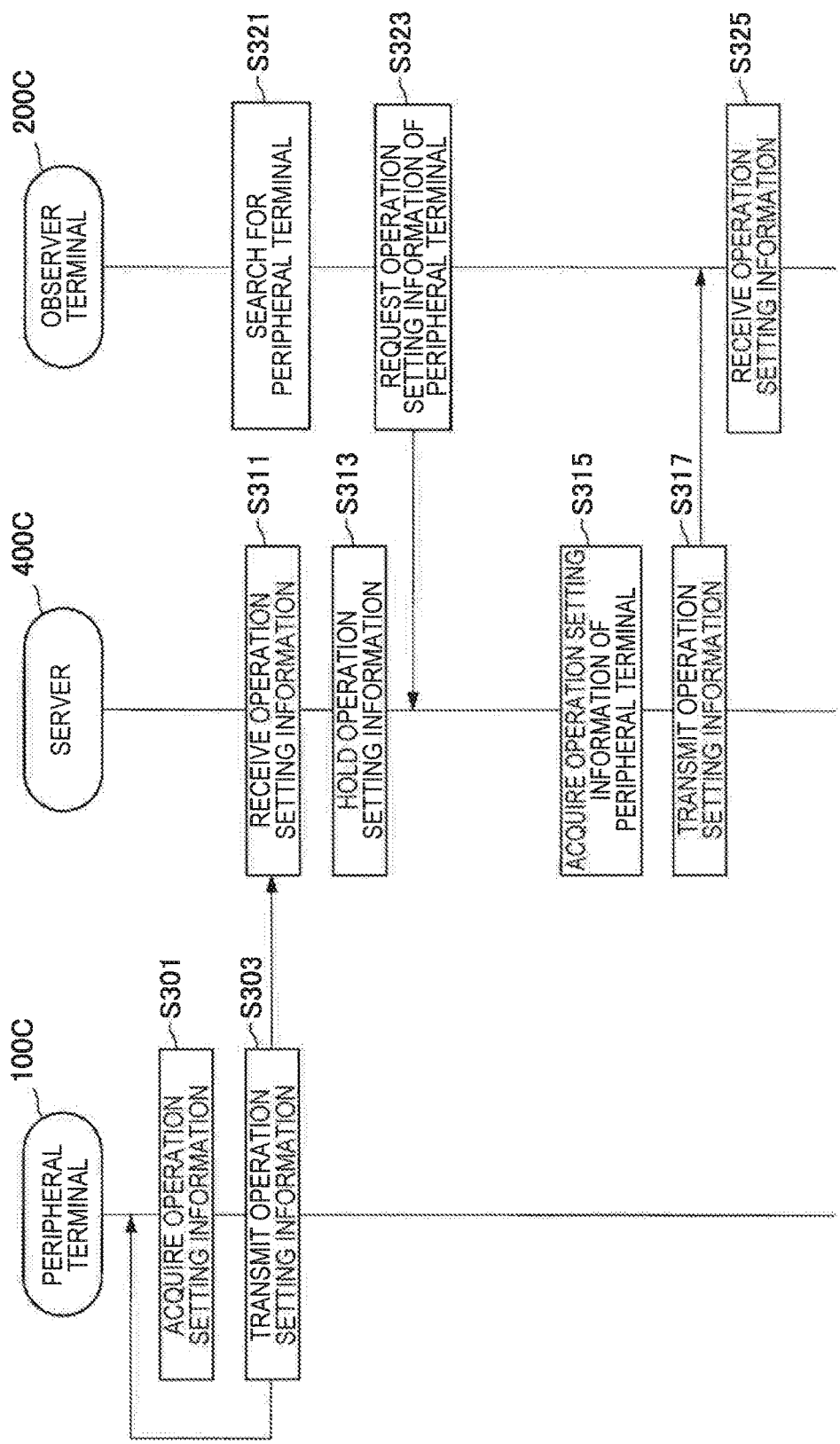
FIG. 12 is a timing chart illustrating information acquisition processing according to the third embodiment of the present disclosure.

As illustrated in FIG. 12, the operation setting information of the sensor 110 of the terminal 100C is acquired within the terminal 100C at a predetermined timing (S301). When the operation setting information is acquired by the operation setting information acquiring unit 120, the operation setting information is transmitted to the server 400C by the communication unit 140 (S303). When the server 400C receives the operation setting information from the terminal 100C (S311), the operation setting information is recorded in the operation setting information storage unit 430 by the control unit 420 (S313). Note that processing of step S301 and S303 is repeatedly performed, and processing of step S311 and S313 is executed at a timing when the server 400C receives the operation setting information.

Meanwhile, the observer Po searches whether or not there is an information processing terminal which is likely to acquire a state of the observer Po near the observer Po using the observer terminal 200C (S321). Then, when an information processing terminal which is likely to acquire the state of the observer Po is detected within a predetermined range from the observer Po, the observer Po acquires identification information of the peripheral terminal 100C from the observer terminal 200C which desires to know an operation state and setting information of the sensor, and requests the operation setting information of the terminal 100C to the server 400C (S323). Note that the acquisition processing of the identification information of the terminal 100C may be performed in a similar manner to step S211 described in the above-described second embodiment.

When the server 400C receives the identification information from the observer terminal 200C, the operation setting information associated with the identification information is acquired from the operation setting information storage unit 430 by the control unit 420 (S315). The server 400C transmits the acquired operation setting information to the observer terminal 200C (S317). The observer terminal 200C receives the operation setting information from the server 400C (S325) and notifies the observer Po. Notification to the observer Po may be performed using various kinds of notification methods described in the first embodiment.

The information processing system according to the third embodiment of the present disclosure has been described above. According to the information processing system according to the present embodiment, the observer Po can recognize existence of the terminal 100C which is likely to acquire the state of the observer Po by searching the circumference of the observer Po using the observer terminal 200C. Further, as with the case of the first embodiment and the second embodiment, it is possible to recognize operation setting information of a sensor from which the state of the observer Po is likely to be acquired from the circumference for each terminal 100C.

5. Use Case

The following can be considered as a use case of the information processing system according to the present embodiment.

[5.1. Declaration to Circumference that Own Device does not Perform Measurement]

For example, it is possible to declare to the circumference that the own device does not photograph the other people, acquire sound, or the like, using an information processing terminal by the above-described information processing system. By this means, it is possible to avoid suspicion of secret photographing, or the like. To realize this, as in the above-described information processing system, it is necessary to recognize that while a sensor is provided, the sensor is not working, a sensor itself does not exist, or the like, as well as simply recognize a sensor which is working, for each sensor included in the information processing terminal, to distinguish from a person who does not transmit information at all.

Further, as application to the user him/herself, it is possible to utilize the information processing system to detection of a terminal the user forgot to bring for the user who wears a plurality of wearable terminals. For example, by watching each portion of the body through an eyewear terminal when the user leaves home, the user can confirm whether devices exist in correct modes at correct worn positions.

[5.2. Confirmation of Content Acquired at Information Processing Terminal]

Figure 13:
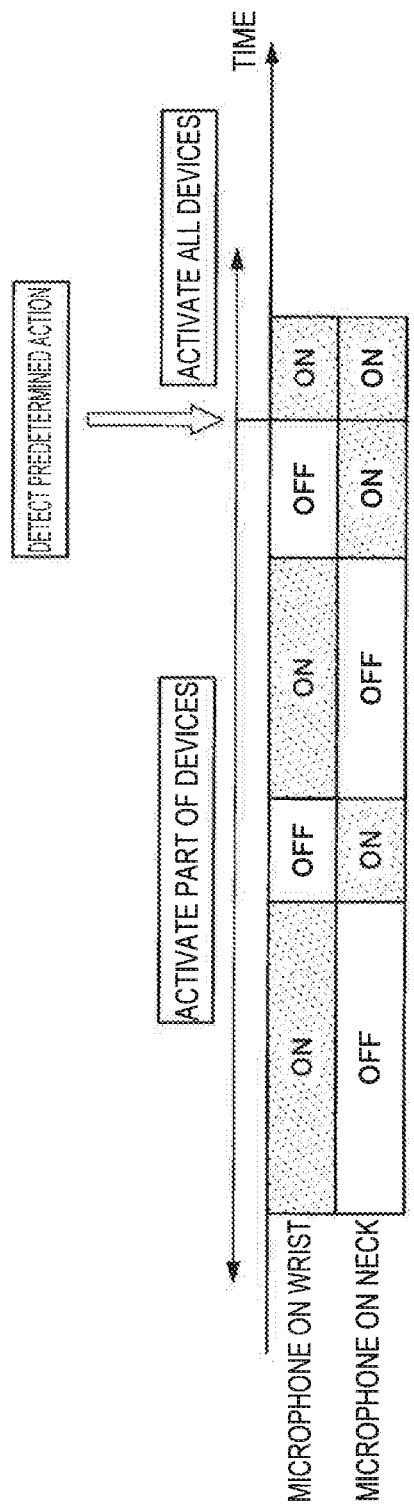
FIG. 13 is an explanatory diagram explaining an example of power saving processing through cooperation of a plurality of devices.

Further, it is also possible to apply the above-described information processing system to confirmation of content acquired by the information processing terminal. For example, it is possible to utilize the above-described information processing system to confirm operation modes of various kinds of sensors which are provided at devices worn by the user and which acquire logs. Further, for example, in the case where a plurality of devices are used, it is possible to realize power saving of each device. For example, in the case where cameras and microphones are mounted on all the devices, there is a case where it is useless to constantly perform photographing and recording at all devices. Therefore, for example, as illustrated in FIG. 13, it is also possible to realize power saving of each device by alternately activating a microphone worn around the wrist and a microphone worn around the next. Switching of activation may be controlled according to, for example, a remaining battery level, a measurement position, or the like.

Meanwhile, there is also application in which a plurality of sensors are activated at the same time to constantly perform measurement, and the best detection result is selected later, or a plurality of detection results are combined, or the like. Therefore, for example, as illustrated in FIG. 13, in the case where certain action, or the like, of the user is detected, it is also possible to activate a microphone on the wrist and the microphone on the neck at the same time, so that the information processing system is put into a fully sensing state.

[5.3. Confirmation of Content Acquired at Peripheral Terminals]

Further, the above-described information processing system can be applied to confirmation of content acquired at information processing terminals (peripheral terminals) located around the user. This use case is a case in which devices held by persons other than the user are also utilized along with the plurality of devices held by the user him/herself in the above-described case. For example, this use case can be utilized in sound recording when a plurality of people travel in a group. In the case where a camera, a microphone and a positioning sensor such as a GPS are mounted on a device held by each of participants, there is a case where it is useless to constantly perform photographing and recording at all devices. Therefore, for example, as illustrated in FIG. 14, it is also possible to realize power saving of each device by alternately activating a microphone of a user A and a microphone of a user B. Switching of activation may be controlled according to, for example, a remaining battery level, a viewpoint position, or the like.

Meanwhile, there is also application in which a plurality of sensors are activated at the same time to constantly perform measurement, and the best detection result is selected later or a plurality of detection results are combined, or the like. Therefore, for example, as illustrated in FIG. 14, in the case where certain action, or the like, of the user is detected, it is also possible to activate the microphone of the user A and the microphone of the user B at the same time so that the information processing system is put into a fully sensing state.

6. Hardware Configuration

Next, with reference to FIG. 15, a hardware configuration of an information processing device according to an embodiment of the present disclosure is explained. FIG. 15 is a block diagram illustrating a hardware configuration example of an information processing device according to the embodiment of the present disclosure. The illustrated information processing device 900 can be implemented as, for example, the information processing terminals 100 and 200 and the server 400 in the above-described embodiments.

The information processing device 900 includes a central processing unit (CPU) 901, read only memory (ROM) 903, and random access memory (RAM) 905. In addition, the information processing device 900 may include a host bus 907, a bridge 909, an external bus 911, an interface 913, an input device 915, an output device 917, a storage device 919, a drive 921, a connection port 923, and a communication device 925. Moreover, the information processing device 900 may include an imaging device 933, and a sensor 935, as necessary. The information processing device 900 may include a processing circuit such as a digital signal processor (DSP), an application-specific integrated circuit (ASIC), or a field-programmable gate array (FPGA), alternatively or in addition to the CPU 901.

The CPU 901 serves as an arithmetic processing apparatus and a control apparatus, and controls the overall operation or a part of the operation of the information processing device 900 according to various programs recorded in the ROM 903, the RAM 905, the storage device 919, or a removable recording medium 927. The ROM 903 stores programs, operation parameters, and the like used by the CPU 901. The RAM 905 transiently stores programs used when the CPU 901 is executed, and various parameters that change as appropriate when executing such programs. The CPU 901, the ROM 903, and the RAM 905 are connected with each other via the host bus 907 configured from an internal bus such as a CPU bus or the like. The host bus 907 is connected to the external bus 911 such as a Peripheral Component Interconnect/Interface (PCI) bus via the bridge 909.

The input device 915 is a device operated by a user such as a mouse, a keyboard, a touch panel, a button, a switch, and a lever. The input device 915 may be a remote control device that uses, for example, infrared radiation and another type of radiowave. Alternatively, the input device 915 may be an external connection device 929 such as a mobile phone that corresponds to an operation of the information processing device 900. The input device 915 includes an input control circuit that generates input signals on the basis of information which is input by a user to output the generated input signals to the CPU 901. A user inputs various types of data to the information processing device 900 and instructs the information processing device 900 to perform a processing operation by operating the input device 915.

The output device 917 includes an apparatus that can report acquired information to a user visually, audibly, or haptically. The output device 917 may be, for example, a display device such as a liquid crystal display (LCD) or an organic electro-luminescence (EL) display, an audio output device such as a speaker or a headphone, or a vibrator. The output device 917 outputs a result obtained through a process performed by the information processing device 900, in the form of video such as text and an image, sounds such as voice and audio sounds, or vibration.

The storage device 919 is an apparatus for data storage that is an example of a storage unit of the information processing device 900. The storage device 919 includes, for example, a magnetic storage device such as a hard disk drive (HDD), a semiconductor storage device, an optical storage device, or a magneto-optical storage device. The storage device 919 stores therein the programs and various data executed by the CPU 901, various data acquired from an outside, and the like.

The drive 921 is a reader/writer for the removable recording medium 927 such as a magnetic disk, an optical disc, a magneto-optical disk, and a semiconductor memory, and built in or externally attached to the information processing device 900. The drive 921 reads out information recorded on the mounted removable recording medium 927, and outputs the information to the RAM 905. Further, the drive 921 writes the record into the mounted removable recording medium 927.

The connection port 923 is a port used to connect devices to the information processing device 900. The connection port 923 may include a Universal Serial Bus (USB) port, an IEEE1394 port, and a Small Computer System Interface (SCSI) port. The connection port 923 may further include an RS-232C port, an optical audio terminal, a High-Definition Multimedia Interface (HDMI) (registered trademark) port, and so on. The connection of the external connection device 929 to the connection port 923 makes it possible to exchange various data between the information processing device 900 and the external connection device 929.

The communication device 925 is a communication interface including, for example, a communication device for connection to a communication network 931. The communication device 925 may be, for example, a communication card for a local area network (LAN), Bluetooth (registered trademark), Wi-Fi, or a wireless USB (WUSB). Further, the communication device 925 may also be, for example, a router for optical communication, a router for asymmetric digital subscriber line (ADSL), or a modem for various types of communication. For example, the communication device 925 transmits and receives signals in the Internet or transits signals to and receives signals from another communication device by using a predetermined protocol such as TCP/IP. The communication network 931 to which the communication device 925 connects is a network established through wired or wireless connection. The communication network 931 may include, for example, the Internet, a home LAN, infrared communication, radio communication, or satellite communication.

The imaging device 933 is an apparatus that captures an image of a real space by using an image sensor such as a charge coupled device (CCD) and a complementary metal oxide semiconductor (CMOS), and various members such as a lens for controlling image formation of a subject image onto the image sensor, and generates the captured image. The imaging device 933 may capture a still image or a moving image.

The sensor 935 is various sensors such as an acceleration sensor, an angular velocity sensor, a geomagnetic sensor, an illuminance sensor, a temperature sensor, a barometric sensor, and a sound sensor (microphone). The sensor 935 acquires information regarding a state of the information processing device 900 such as a posture of a housing of the information processing device 900, and information regarding an environment surrounding the information processing device 900 such as luminous intensity and noise around the information processing device 900. The sensor 935 may include a positioning sensor, such as a GPS receiver that receives a global positioning system (GPS) signals to measure latitude, longitude, and altitude of the apparatus.

The example of the hardware configuration of the information processing device 900 has been described. Each of the structural elements described above may be configured by using a general purpose component or may be configured by hardware specialized for the function of each of the structural elements. The configuration may be changed as necessary in accordance with the state of the art at the time of working of the present disclosure.

7. Supplement

The embodiments of the present disclosure may include, for example, the above-described information processing device (for example, a server), the above-described system, the information processing method executed by the information processing device or the system, a program for causing the information processing device to exhibits its function, and a non-transitory physical medium having the program stored therein.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:

an acquiring unit configured to acquire information relating to a sensor which is likely to acquire a state of a user on the basis of notification information for allowing recognition of existence of a sensor located around the user.

(2)

The information processing device according to (1),
in which the acquiring unit is provided at an observer terminal used by the user.

(3)

The information processing device according to (2),
in which the notification information is information displayed at a target terminal and is information for allowing acquisition of operation setting information of one or more sensors included in the target terminal, and
the acquiring unit directly acquires the notification information from the target terminal and acquires the operation setting information of the sensor included in the target terminal.

(4)

The information processing device according to (2),
in which the notification information is identification information displayed at a target terminal and is information for identifying the target terminal, and
the acquiring unit directly acquires the notification information from the target terminal and acquires operation setting information of a sensor included in the target terminal from a server which manages operation setting information of one or more sensors included in the target terminal, on the basis of the acquired notification information.

(5)

The information processing device according to (4),
in which the identification information is a barcode.

(6)

The information processing device according to (2),
in which the acquiring unit directly acquires the notification information from a target terminal in response to a request from the user who receives potential information for notifying the user of existence of one or more sensors included in the target terminal located around the user and a possibility of acquiring a state of the user, and acquires operation setting information of the sensor included in the target terminal.

(7)

The information processing device according to any one of (1) to (6),
in which information relating to a sensor which is likely to acquire a state of the user is operation setting information of the sensor including at least an ON/OFF state of the sensor.

(8)

The information processing device according to any one of (1) to (7),
in which the notification information is information to be decoded at a terminal which receives the notification information.

(9)

The information processing device according to any one of (1) to (8),
in which the user is notified of information relating to a sensor which is likely to acquire a state of the user using at least one of display of a character string, sound notification, anthropomorphic display, display of an icon and animation display.

(10)

An information processing device including:
a notifying unit configured to notify a user of potential information for notifying the user of existence of one or more sensors included in a target terminal located around the user and a possibility of acquiring a state of the user.

(11)

The information processing device according to (10), including:
an acquiring unit configured to acquire information relating to a sensor which is likely to acquire the state of the user in response to the potential information.

(12)

An information processing method including:
acquiring information relating to a sensor which is likely to acquire a state of a user on the basis of notification information for allowing recognition of existence of a sensor located around the user by a processor.

(13)

A program causing a computer to function as an information processing device including:
an acquiring unit configured to acquire information relating to a sensor which is likely to acquire a state of a user on the basis of notification information for allowing recognition of existence of a sensor located around the user.

REFERENCE SIGNS LIST 100A, 100B target terminal
100C (100CA to 100CC) peripheral terminal
110 sensor
120 operation setting information acquiring unit
130 sensor notifying unit
140 communication unit
150 identification information notifying unit
200A, 200B, 200C observer terminal
210 notification information acquiring unit
220 notification processing unit
230 notifying unit
240 identification information acquiring unit
250 communication unit
260 search processing unit
400B, 400C server
410 communication unit
420 control unit
430 operation setting information storage unit

The invention claimed is:

1. An information processing device comprising:
a communication unit configured to
receive, from a server, location information of another information processing device; and
a notifying unit configured to
output, based on the location information, a notification as to whether the another information processing device is within a predetermined range from the information processing device,
wherein the communication unit is further configured to
directly receive, from the another information processing device and based on the notification, identification information including an identifier specific to the another information processing device for identifying the another information processing device, the identification information being displayed at the another information processing device,
transmit the received identification information to the server which manages operation setting information of one or more sensors included in the another information processing device and configured to sense a user, the operation setting information including a state of the one or more sensors included in the another information processing device, and
receive, from the server, the operation setting information on the basis of the transmitted identification information, wherein the notifying unit is further configured to display the another information processing device to have an appearance notifying that the operation setting information indicates that the state of the one or more sensors included in the another information processing device is not activated, wherein a volume of the sound notification is first level when the state of the one or more sensors is activated, and the volume of the sound notification is a second level different than the first level when the state of the one or more sensors is not activated, wherein the state of one sensor of the one or more sensors and the state of another sensor of the one or more sensors are switched based on a remaining battery level or a measurement position of the one sensor or the another sensor, and wherein the communication unit and the notifying unit are each implemented via at least one processor.

2. The information processing device according to claim 1,
wherein the identification information includes information for allowing acquisition of the operation setting information of the one or more sensors included in the another information processing device, and
wherein the communication unit receives the operation setting information of the one or more sensors included in the another information processing device.

3. The information processing device according to claim 1,
wherein the identification information includes a barcode.

4. The information processing device according to claim 1,
wherein the communication unit directly receives the identification information from the another information processing device in response to a request from the user who receives potential information for notifying the user of existence of the one or more sensors included in the another information processing device located around the user and a possibility of sensing the user, and receives the operation setting information of the one or more sensors included in the another information processing device.

5. The information processing device according to claim 1,
wherein the state of the one or more sensors includes at least an ON/OFF state of the one or more sensors.

6. The information processing device according to claim 1,
wherein the identification information includes information to be decoded at a terminal which receives the identification information.

7. The information processing device according to claim 1,
wherein the user is notified of the state of the one or more sensors using at least one of display of a character string, sound notification, anthropomorphic display, display of an icon, or animation display.

8. The information processing device according to claim 1,
wherein the operation setting information further includes at least one of a sampling period of the one or more sensors, a dynamic range of the one or more sensors, or a cutoff frequency of the one or more sensors.

9. The information processing device according to claim 1,
wherein the operation setting information further includes a resolution of the one or more sensors.

10. The information processing device according to claim 1, further comprising a camera,
wherein the notifying unit is further configured to determine, based on the notification, whether or not to activate the camera to directly acquire, from the another information processing device, the identification information.

11. An information processing device comprising:
a notifying unit configured to
display, at the information processing device, identification information including an identifier specific to the information processing device for identifying the information processing device; and
a communication unit configured to
transmit, to a server, location information of the information processing device, the identification information, and operation setting information of one or more sensors included in the information processing device and configured to sense a user, the location information being utilized by another information processing device to output a notification as to whether the another information processing device is within a predetermined range from the information processing device,
wherein the identification information is received by the another information processing device, based on the notification, to notify a user of existence of the one or more sensors, and is to be transmitted by the another information process device to the server to acquire the operation setting information from the server,
wherein the operation setting information is received by the another information processing device to display the information processing device having an appearance notifying that the operation setting information indicates that the state of the one or more sensors included in the another information processing device is not activated,
wherein the notifying unit is further configured to display the another information processing device to have an appearance notifying that the operation setting information indicates that the state of the one or more sensors included in the another information processing device is not activated,
wherein a volume of the sound notification is first level when the state of the one or more sensors is activated, and the volume of the sound notification is a second level different than the first level when the state of the one or more sensors is not activated,
wherein the state of one sensor of the one or more sensors and the state of another sensor of the one or more sensors are switched based on a remaining battery level or a measurement position of the one sensor or the another sensor, and
wherein the notifying unit and the communication unit are each implemented via at least one processor.

12. The information processing device according to claim 11,
wherein the communication unit is configured to receive the operation setting information, the operation setting information including a state of the one or more sensors included in the information processing device, and
wherein the identification information includes information for allowing acquisition of the operation setting information.

13. An information processing method comprising:
receiving, from a server, location information of an information processing device;

outputting, based on the location information, a notification as to whether the information processing device is within a predetermined range from another information processing device;

directly receiving, from the information processing device and based on the notification, identification information including an identifier specific to the information processing device for identifying the information processing device, the identification information being displayed at the information processing device;

transmitting the received identification information to the server which manages operation setting information of one or more sensors included in the information processing device and configured to sense a user, the operation setting information including a state of the one or more sensors included in the information processing device;

receiving, from the server, the operation setting information on the basis of the transmitted identification information; and displaying the another information processing device to have an appearance notifying that the operation setting information indicates that the state of the one or more sensors included in the another information processing device is not activated, wherein a volume of the sound notification is first level when the state of the one or more sensors is activated, and the volume of the sound notification is a second level different than the first level when the state of the one or more sensors is not activated, and wherein the state of one sensor of the one or more sensors and the state of another sensor of the one or more sensors are switched based on a remaining battery level or a measurement position of the one sensor or the another sensor.

14. A non-transitory computer-readable medium having embodied thereon a program, which when executed by a computer causes the computer to execute an information processing method, the method comprising:

receiving, from a server, location information of an information processing device;

outputting, based on the location information, a notification as to whether the information processing device is within a predetermined range from another information processing device;

directly receiving, from an information processing device and based on the notification, identification information including an identifier specific to the information processing device for identifying the information processing device, the identification information being displayed at the information processing device;

transmitting the received identification information to the server which manages operation setting information of one or more sensors included in the information processing device and configured to sense a user, the operation setting information including a state of the one or more sensors included in the information processing device;

receiving, from the server, the operation setting information on the basis of the transmitted identification information; and displaying the another information processing device to have an appearance notifying that the operation setting information indicates that the state of the one or more sensors included in the another information processing device is not activated, wherein a volume of the sound notification is first level when the state of the one or more sensors is activated, and the volume of the sound notification is a second level different than the first level when the state of the one or more sensors is not activated, and wherein the state of one sensor of the one or more sensors and the state of another sensor of the one or more sensors are switched based on a remaining battery level or a measurement position of the one sensor or the another sensor.

* * * * *